United States Patent
Seok

(10) Patent No.: US 9,674,783 B2
(45) Date of Patent: *Jun. 6, 2017

(54) METHOD FOR TRANSMITTING AND RECEIVING PHYSICAL LAYER CONVERGENCE PROCEDURE PROTOCOL DATA UNIT IN WIRELESS LOCAL AREA NETWORK SYSTEM SUPPORTING POWER SAVE MODE OPERATION AND APPARATUS FOR THE SAME

(71) Applicant: LG Electronics Inc., Seoul (KR)

(72) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,852

(22) Filed: Dec. 14, 2015

(65) Prior Publication Data

US 2016/0165625 A1    Jun. 9, 2016

Related U.S. Application Data

(63) Continuation of application No. 14/122,555, filed as application No. PCT/KR2011/008970 on Nov. 23, 2011, now Pat. No. 9,237,521.

(Continued)

(51) Int. Cl.
*H04W 52/02* (2009.01)
*H04B 7/0452* (2017.01)
*H04W 72/12* (2009.01)

(52) U.S. Cl.
CPC ...... *H04W 52/0216* (2013.01); *H04B 7/0452* (2013.01); *H04W 52/0219* (2013.01);
(Continued)

(58) Field of Classification Search
None
See application file for complete search history.

(56) References Cited

U.S. PATENT DOCUMENTS

| | | | |
|---|---|---|---|
| 2009/0196212 A1 | 8/2009 | Wentink | H04W 52/0235 370/311 |
| 2010/0190506 A1 | 7/2010 | To et al. | 455/452.1 |

(Continued)

FOREIGN PATENT DOCUMENTS

| | | |
|---|---|---|
| JP | 2008205904 A | 9/2008 |
| JP | 2009-05118 A | 1/2009 |

(Continued)

OTHER PUBLICATIONS

IEEE Standards Association: IEEE Standard for Local and metropolitan area networks—Part 16: Air Interface for Broadband Wireless Access Systems; Amendment 3: Advanced Air Interface; IEEE Std. 802.16m-2011 (Amendment to IEEE std. 802. 16-2009), IEEE Standard, IEEE, Piscataway, NJ, USA, May 6, 2011 (May 6, 2011), pp. 1-1112, XP06845643, ISBN: 978-0-7381-6595-0 *the whole document*.

*Primary Examiner* — Min Jung
(74) *Attorney, Agent, or Firm* — Dentons US LLP

(57) ABSTRACT

A method of transmitting a data frame in a wireless local area network (WLAN) is provided. The method includes transmitting, by an access point (AP), a scheduling information element including information on a time period for data frame transmission to a first station (STA) and a second STA, wherein the scheduling information element includes an offset field indicating a start time point of the time period and transmitting, by the AP, the data frame to the first STA and the second STA by using a multi user-multiple input multiple output (MU-MIMO) transmission scheme after the start time point indicated by the offset field.

8 Claims, 8 Drawing Sheets

Related U.S. Application Data

(60) Provisional application No. 61/491,871, filed on May 31, 2011.

(52) U.S. Cl.
CPC ... *H04W 52/0225* (2013.01); *H04W 72/1263* (2013.01); *Y02B 60/50* (2013.01)

(56) References Cited

U.S. PATENT DOCUMENTS

| | | | |
|---|---|---|---|
| 2010/0309872 A1 | 12/2010 | Amini et al. | |
| 2011/0090855 A1 | 4/2011 | Kim | |
| 2011/0110349 A1* | 5/2011 | Grandhi | H04W 28/18 370/338 |
| 2011/0194475 A1 | 8/2011 | Kim et al. | 370/311 |
| 2012/0120931 A1* | 5/2012 | Abraham | H04W 72/121 370/338 |
| 2012/0207071 A1 | 8/2012 | Zhu et al. | 370/311 |
| 2012/0275364 A1 | 11/2012 | Anderson | H04W 52/0219 370/311 |
| 2013/0010664 A1 | 1/2013 | Kang et al. | 370/311 |
| 2013/0250832 A1 | 9/2013 | Kim et al. | 370/311 |
| 2013/0329620 A1 | 12/2013 | Kim et al. | 370/311 |
| 2013/0336306 A1* | 12/2013 | Sohn, III | H04B 7/0877 370/338 |

FOREIGN PATENT DOCUMENTS

| | | |
|---|---|---|
| JP | 2010-57072 A | 3/2010 |
| JP | 2010-93613 A | 4/2010 |
| JP | 4579947 B2 | 9/2010 |
| JP | 2011-49721 A | 3/2011 |
| JP | 2011-101276 A | 5/2011 |
| KR | 10-2005-0089840 A | 9/2005 |
| KR | 10-2005-0117363 A | 12/2005 |
| KR | 10-0662614 B | 1/2007 |
| WO | 2011/049360 A2 | 4/2011 |
| WO | 2011/056790 A1 | 5/2011 |

* cited by examiner

METHOD FOR TRANSMITTING AND RECEIVING PHYSICAL LAYER CONVERGENCE PROCEDURE PROTOCOL DATA UNIT IN WIRELESS LOCAL AREA NETWORK SYSTEM SUPPORTING POWER SAVE MODE OPERATION AND APPARATUS FOR THE SAME

This application is a Continuation of U.S. application Ser. No. 14/123,155 filed Nov. 29, 2013, which is a National Stage under 35 U.S.C. 371 of International Application No. PCT/KR2011/008970 filed Nov. 23, 2011, which claims the benefit of U.S. Provisional Application No. 61/491,871 filed May 31, 2011, all of which are hereby incorporated by reference in their entirety.

BACKGROUND OF THE INVENTION

Field of the Invention

The present invention relates to a wireless local area network (WLAN) system, and more particularly, to a method of transmitting and receiving a physical layer convergence procedure (PLCP) protocol data unit (PPDU) by a station (STA) in the WLAN system supporting a power save mode operation.

Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

The WLAN system supports an active mode and a power save mode as an operation mode of a station (STA). The active mode implies an operation mode in which the STA operates in an awake state capable of transmitting and receiving a frame. On the other hand, the power save mode is supported for power saving of an STA required to stay the active state for receiving the frame. An STA supporting the power save mode (PSM) can avoid unnecessary power consumption by operating in a doze mode when it is not a time period in which the STA can access to a radio medium. That is, the STA operates in the awake state only for a time period in which a frame can be transmitted to the STA or a time period in which the STA can transmit the frame. With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

To effectively utilize a radio channel, the next-generation WLAN system supports multi user-multiple input multiple output (MU-MIMO) transmission in which a plurality of non-access point (AP) stations (STAs) concurrently access to a channel. According to the MU-MIMO transmission, an AP can transmit a physical layer convergence procedure (PLCP) protocol data unit (PPDU) concurrently to one or more MIMO-paired STAs.

However, since STAs that operate in the power save mode operate by transitioning between the doze state and the awake state, MU-MIMO transmission of the AP is dependent on an operation state of MU-MIMO paired STAs. Therefore, the AP needs to provide information on a time period for MU-MIMO transmission to the MU-MIMO paired STAs. Accordingly, there is a need for a method of transmitting and receiving a PPDU by using a MU-MIMO transmission scheme in the WLAN system supporting the power save mode operation.

SUMMARY OF THE INVENTION

The present invention provides a method of transmitting and receiving a physical layer convergence procedure (PLCP) protocol data unit (PPDU) by a station (STA) in a wireless local area network (WLAN) system supporting a power save mode operation.

In an aspect, a method of transmitting a data frame in a wireless local area network (WLAN) is provided. The method includes transmitting, by an access point (AP), a scheduling information element including information on a time period for data frame transmission to a first station (STA) and a second STA, wherein the scheduling information element includes an offset field indicating a start time point of the time period and transmitting, by the AP, the data frame to the first STA and the second STA by using a multi user-multiple input multiple output (MU-MIMO) transmission scheme after the start time point indicated by the offset field.

The method may further include operating, by the first STA and the second STA, by transitioning to an awake state at the start time point indicated by the offset field.

The scheduling information element may include a group identifier indicating a target STA group of the data frame transmission, and wherein the target STA group includes the first STA and the second STA.

The operating by transitioning to the awake state may include determining, by each STA of the first STA1 and the second STA2, whether the each STA is a member STA of the target STA group on the basis of the group identifier field of the scheduling information element and if the each STA is the member STA, operating, by the each STA, by transitioning to the awake state.

The scheduling information element may further include a duration field indicating duration of the time period and transmitting of the data frame may be performed within the duration indicated by the duration field.

The method may further comprises operating, by the first STA and the second STA, by transitioning to a doze state when the time period elapses from the start time point.

The scheduling information element may further include an interval subfield indicating an interval in which the time period is resumed periodically, and the method further may further include operating, by the first STA and the second STA, by transitioning to the awake state in every interval with respect to the start time point.

The data frame may include a data unit and a signal field including information for interpreting the data frame, and the signal field may include the group identifier and an indicator indicating the number of spatial streams respectively assigned to the first STA and the second STA.

The method may further include operating, by the first STA and the second STA, by transitioning to a doze state when the indicator indicates that the number of assigned spatial streams is 0.

The method may further include receiving, by the AP, a first trigger frame from the first STA to announce that the first STA is ready to receive the data frame after the start time point; and receiving, by the AP, a second trigger frame from the second STA to announce that the second STA is ready to receive the data frame after the start time point.

The data frame may be transmitted after receiving the first trigger frame and the second trigger frame.

In another aspect, a wireless apparatus is provided. The apparatus includes a transceiver for transmitting and receiving a radio signal and a processor functionally coupled to the transceiver, wherein the processor is configured for transmitting a scheduling information element including information on a time period for data frame transmission to a first STA and a second STA, and transmitting the data frame to the first STA and the second STA by using a MU-MIMO transmission scheme after the start time point indicated by the offset field. The scheduling information element includes an offset field indicating a start time point of the time period An access point (AP) provides information on a wakeup period for multi user-multiple input multiple output (MU-MIMO) transmission to MU-MIMO paired stations (STAs). Accordingly, the STAs can recognize a time point at which the AP transmits a physical layer convergence procedure (PLCP) protocol data unit (PPDU), and can wait to receive the PPDU by transitioning to an awake state in accordance with the recognized time point. Since the STAs maintain the awake state in accordance with a time period in which the PPDU is transmitted, unnecessary power consumption can be avoided.

The AP is configured such that a PPDU is transmitted after receiving a trigger frame transmitted by the STA or such that a wakeup period is resumed in every delivery traffic indication map (DTIM) transmission period. Therefore, it can be guaranteed that the STA is in a reception waiting state before PPDU transmission. Accordingly, highly reliable PPDU transmission can be guaranteed, and overall throughput of a wireless local area network (WLAN) system can be improved by avoiding retransmission of the same traffic.

DESCRIPTION OF EXEMPLARY EMBODIMENTS

Figure 1:
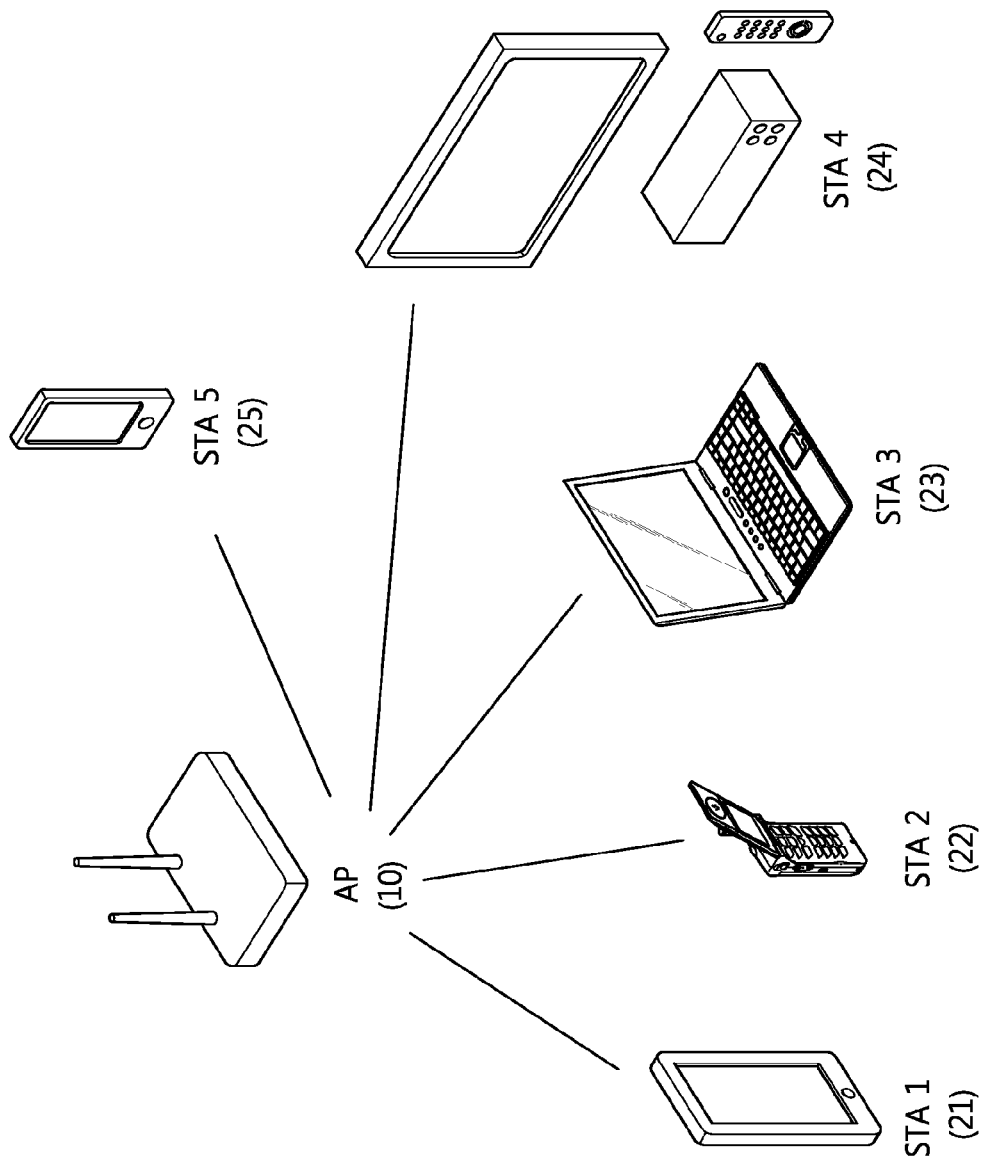
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The AP and/or the STA may perform a procedure of exchanging a request to send (RTS) frame and a clear to send (CTS) frame to announce that it intends to access a medium. The RTS frame and the CTS frame include information indicating a time duration reserved for access of a radio medium required to transmit and receive an acknowledgement (ACK) frame when an actual data frame transmission and reception ACK is supported. Upon receiving an RTS frame transmitted from an AP and/or an STA intending to transmit a frame or upon receiving a CTS frame transmitted from a frame transmission target STA, another STA can be configured not to access to the medium for the time duration indicated by the information included in the RTS/CTS frame. This can be implemented by configuring an NAV for the time duration.

Meanwhile, if channel sensing is always performed for frame transmission and reception, it causes persistent power consumption of the STA. Since power consumption in a reception state is not much different from power consumption in a transmission state, if the reception state needs to be continuously maintained, relatively great power consumption is generated in an STA that operates by using a battery. Therefore, when the STA senses a channel by persistently maintaining a reception standby state in a WLAN system, ineffective power consumption may be caused without a special synergy effect in terms of a WLAN throughput, and thus it may be inappropriate in terms of power management.

To compensate for the problem above, the WLAN system supports a power management (PM) mode of the STA. A power management (PM) mode of a STA is classified into an active mode and a power save (PS) mode in a WLAN system. Basically, the STA operates in the active mode. When operating in the active mode, the STA can operate in an awake state so that a frame can be received all the time.

When operating in the PS mode, the STA operates by transitioning between a doze state and the awake state. When operating in the doze state, the STA operates with minimum power, and does not receive a radio signal, including a data frame, transmitted from an AP. In addition, the STA operating in the doze state does not perform channel sensing.

The longer the STA operates in a doze state, the less the power consumption is, and thus the longer the STA operates. However, since a frame cannot be transmitted and received in the doze state, the STA cannot operate long unconditionally. If the STA operating in the doze state has a frame to be transmitted to the AP, the STA can transition to an awake state to transmit the frame. However, if the AP has a frame to be transmitted to the STA operating in the doze state, the STA cannot receive the frame and cannot know that there is the frame to be received. Therefore, the STA may need to know whether there is the frame to be transmitted to the STA, and if the frame exists, may require an operation for transitioning to the awake state in accordance with a specific period. According to this operation, the AP can transmit the frame to the STA. This will be described with reference to FIG. 2.

Figure 2:
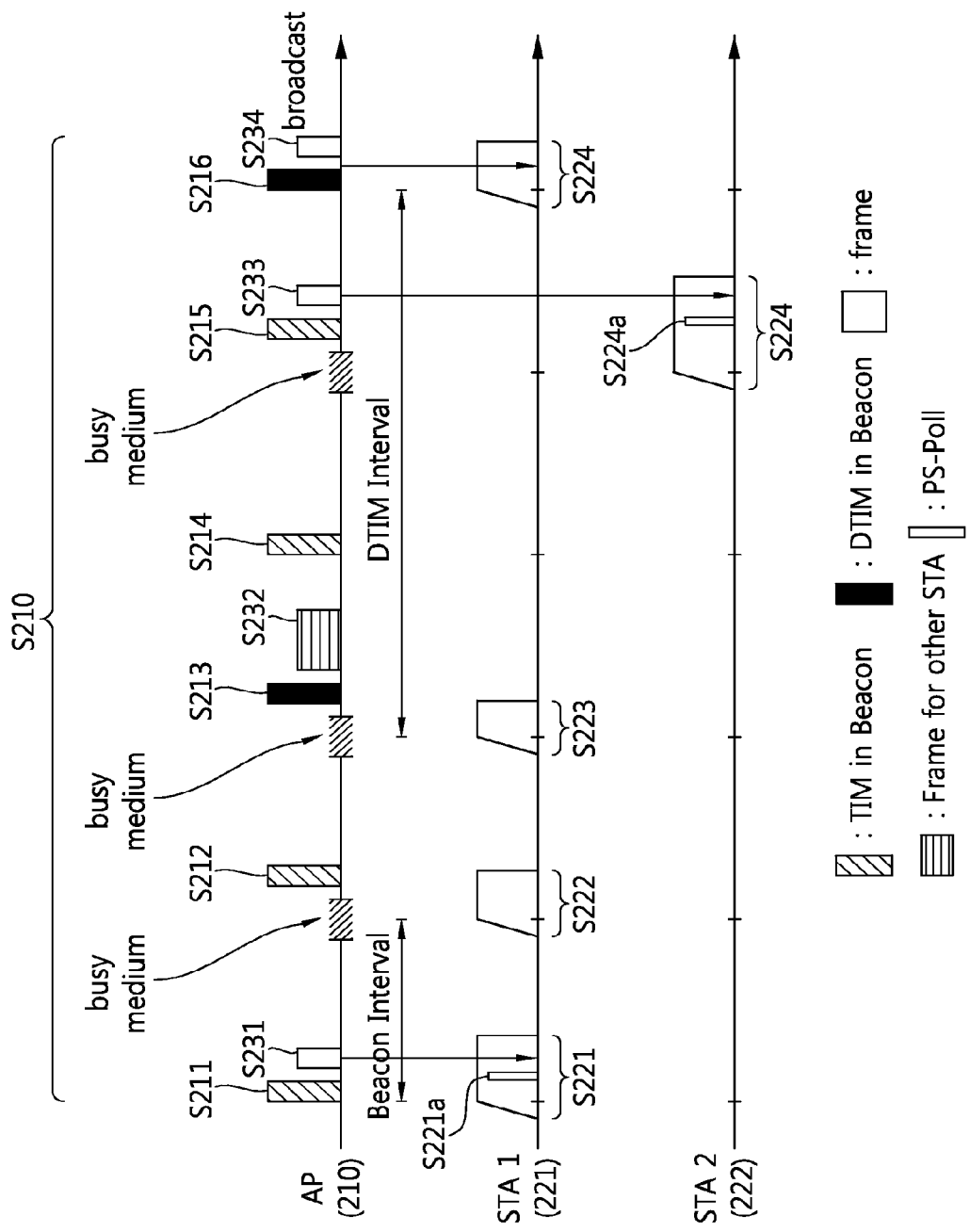
FIG. 2 shows an example of a power management operation.

FIG. 2 shows an example of a power management operation.

Referring to FIG. 2, an AP 210 transmits a beacon frame to STAs in a BSS in accordance with a specific period (step S210). The beacon frame includes a traffic indication map (TIM) information element. The TIM element includes information for reporting that the AP 210 has buffered traffic for which the STAs associated with and a frame will be transmitted. Examples of the TIM element include a TIM used to report a unicast frame and a delivery traffic indication map (DTIM) used to report a multicast or broadcast frame.

The AP 210 transmits the DTIM one time whenever a beacon frame is transmitted three times.

An STA1 221 and an STA2 222 are STAs operating in a PS mode. The STA1 221 and the STA2 222 can be configured such that they can transition from a doze state to an awake state in every wakeup interval of a specific period to receive the TIM element transmitted by the AP 210.

A specific wakeup interval can be configured such that the STA1 221 transitions to the awake state in every beacon interval to receive the TIM element. Therefore, the STA1 221 transitions to the awake state (step S221) when the AP 210 transmits a first beacon frame (step S211). The STA1 221 receives the beacon frame and acquires the TIM element. If the acquired TIM element indicates that there is a frame to be transmitted to the STA1 221, then the STAT 221 transmits to the AP 210 a PS poll frame that requests the AP 210 to transmit a frame (step S221a). The AP 210 transmits the frame to the STA1 221 in response to the PS poll frame (step S231). Upon completion of frame reception, the STA1 221 operates by transitioning back to the doze state.

When the AP 210 transmits a second beacon frame, a medium is busy, that is, another device accesses to the medium for example. Thus, the AP 210 may not be able to transmit the beacon frame in accordance with a correct beacon interval but may transmit it at a delayed time point (step S212). In this case, the STA1 221 switches its mode to the wake state in accordance with the beacon interval, but cannot receive the beacon frame transmitted with delay, and thus transitions back to the doze state (step S222).

When the AP 210 transmits a third beacon frame, the beacon frame may include a TIM element which is configured as a DTIM. However, since the medium is busy, the AP 210 transmits the beacon frame with delay (step S213). The STA1 221 operates by transitioning to the awake state in accordance with the beacon interval, and can acquire the DTIM by using the beacon frame transmitted by the AP 210. The DTIM acquired by the STA1 221 indicates that there is no frame to be transmitted to the STA1 221 and there is a frame for another STA. Therefore, the STA1 221 operates by transitioning back to the doze state. After transmitting the beacon frame, the AP 210 transmits the frame to a corresponding STA (step S232).

The AP 210 transmits a fourth beacon frame (step S214). However, since the STA1 221 cannot acquire information indicating that there is buffered traffic for the STA1 221 by receiving the TIM element two times, the STA1 221 may regulate a wakeup interval for receiving the TIM element. Alternatively, if signaling information for regulating a wakeup interval value of the STA1 221 is included in the beacon frame transmitted by the AP 210, the wakeup interval value of the STA1 221 may be regulated. Instead of transitioning an operation state for every beacon interval to receive the TIM element, the STA1 221 can be configured in the present embodiment such that the operation state is transitioned one time for every three beacon intervals. Therefore, the STA1 221 cannot acquire a corresponding TIM element since the AP 210 transmits the fourth beacon frame (step S214), and maintains the doze state when a fifth beacon frame is transmitted (step S215).

When the AP 210 transmits a sixth beacon frame (step S216), the STA1 221 operates by transitioning to the awake state, and acquires the TIM element included in the beacon frame (step S224). The TIM element is a DTIM that indicates existence of a broadcast frame, and thus the STAT 221 receives the broadcast frame transmitted by the AP 210 (step S234) instead of transmitting a PS poll frame to the AP 210.

Meanwhile, the wakeup interval assigned to the STA2 222 may have a longer period than that of the STA1 221. Therefore, the STA2 222 can receive the TIM element by transitioning to the awake state (step S225) when the fifth beacon frame is transmitted (step S215). The STA2 222 knows existence of a frame to be transmitted to the STA2 222 by using the TIM element, and transmits a PS poll frame to the AP 210 to request transmission (step S225*a*). The AP 210 transmits a frame to the STA2 222 in response to the PS poll frame (step S233).

In order to operate the PS mode of FIG. 2, the TIM element includes a TIM that indicates whether there is a frame to be transmitted to the STA or a DTIM that indicates whether there is a broadcast/multicast frame. The DTIM may be implemented by configuring a field of the TIM element.

Unlike the conventional WLAN system, the next generation WLAN system requires a higher throughput. This is called a very high throughput (VHT). For this, the next generation WLAN system intends to support 80 MHz, contiguous 160 MHz, non-contiguous 160 MHz bandwidth transmission and/or higher bandwidth transmission. In addition, a multi user-multiple input multiple output (MU-MIMO) transmission scheme is provided for the higher throughput. In the next generation WLAN system, an AP can transmit a data frame simultaneously to at least one or more MIMO-paired STAs. In the WLAN system of FIG. 1, an AP 10 can transmit data simultaneously to an STA group including at least one or more STAs among a plurality of STAs 21, 22, 23, 24, and 25 associated with the AP 10. In this case, data transmitted to each STA can be transmitted through different spatial streams. A data frame transmitted by the AP 10 can be referred to as a physical layer convergence procedure (PLCP) protocol data unit (PPDU) generated and transmitted in a physical layer (PHY) of the WLAN system. It is assumed in the embodiment of the present invention that a transmission target STA group which is MU-MIMO paired with the AP 10 is the STA1 21, the STA2 22, the STA3 23, and the STA4 24. In this case, the spatial stream may not be allocated to a specific STA in the transmission target STA group and thus data may not be transmitted. Meanwhile, it is assumed that the STA5 25 is an STA which is associated with the AP but is not included in the transmission target STA group.

Figure 3:
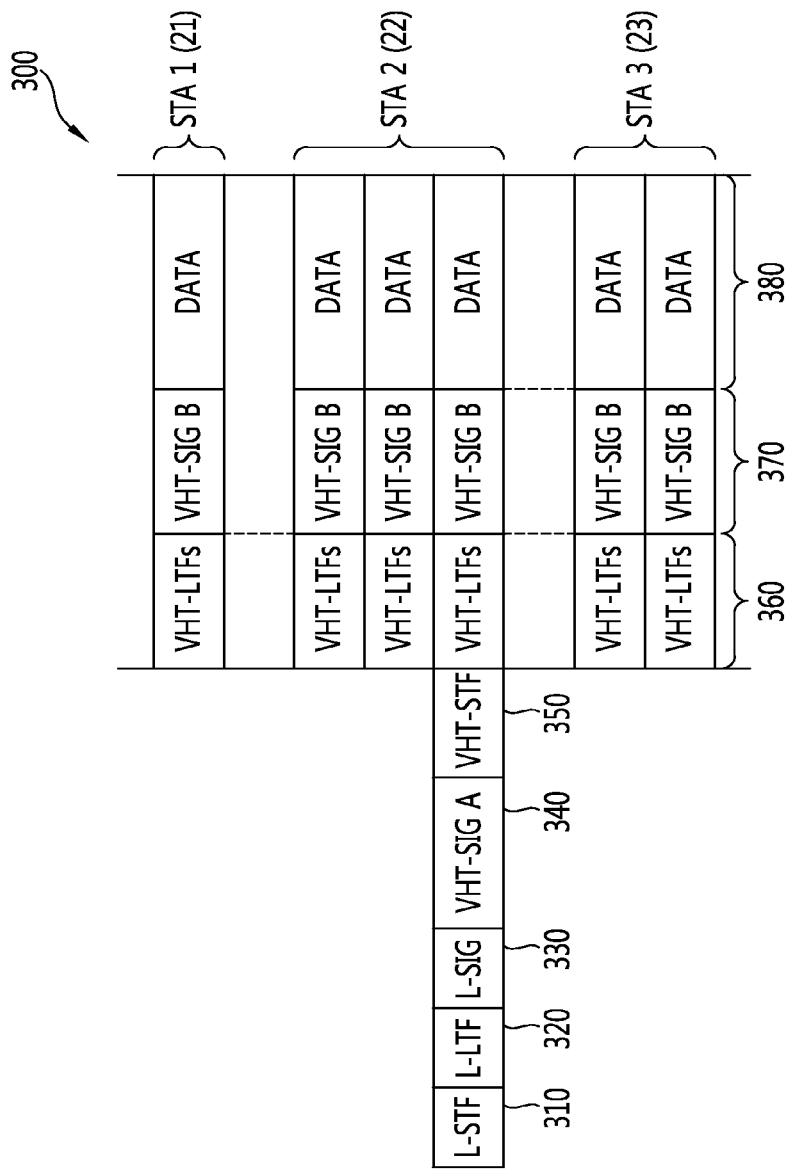
FIG. 3 shows an example of a PPDU format according to an embodiment of the present invention.

FIG. 3 shows an example of a PPDU format according to an embodiment of the present invention.

Referring to FIG. 3, a PPDU 300 includes an L-STF field 310, an L-LTF field 320, an L-SIG field 330, a VHT-SIGA field 340, a VHT-STF field 350, a VHT-LTF field 360, a VHT-SIGB field 370, and a data field 380.

A PLCP sub-layer constituting a PHY converts a PLCP service data unit (PSDU) delivered from a MAC layer into the data field 380 by appending necessary information to the PSDU, generates the PPDU 300 by appending several fields such as the L-STF field 310, the L-LTF field 320, the L-SIG field 330, the VHT-SIGA field 340, the VHT-STF field 350, the VHT-LTF field 360, the VHT-SIGB field 370, or the like, and delivers the PPDU 300 to one or more STAs through a physical medium dependent (PMD) sub-layer constituting the PHY.

The L-STF field 310 is used for frame timing acquisition, automatic gain control (AGC) convergence, coarse frequency acquisition, etc.

The L-LTF field 320 is used for channel estimation for demodulation of the L-SIG field 330 and the VHT-SIGA field 340.

The L-SIG field 330 is used when an L-STA receives the PPDU to acquire data.

The VHT-SIGA field 340 includes control information for interpreting the received PPDU 300 as common control information required for VHT-STAs which are MIMO-paired with an AP. The VHT-SIGA field 340 includes information on a spatial stream for each of the plurality of MIMO-paired STAs, bandwidth information, identification information regarding whether space time block coding (STBC) is used, a group identifier for a transmission target STA group, information regarding a spatial stream allocated to an STA included in a transmission target group STA indicated by the group identifier, information regarding a short guard interval (GI) of the transmission target STA, coding information, modulation and coding scheme (MCS) information, information indicating whether beamforming is performed, and CRC related information. Herein, the group identifier may include whether a currently used MIMO transmission method is MU-MIMO or SU-MIMO. The VHT-SIGA field 340 may be transmitted by using two OFDM symbols. In this case, a field related to a symbol that comes first can be referred to as a VHT-SIGA1, and a field related to a subsequent symbol can be referred to as a VHT-SIGA2 field.

The VHT-STF field 350 is used to improve performance of AGC estimation in MIMO transmission.

The VHT-LTF field 360 is used when the STA estimates a MIMO channel. Since the next generation WLAN system supports MU-MIMO, the VHT-LTF field 360 can be configured by the number of spatial streams on which the PPDU 300 is transmitted. In addition, when full channel sounding is supported and is performed, the number of VHT-LTFs may increase.

The VHT-SIGB field 370 includes dedicated control information required when the plurality of MIMO-paired STAs receive the PPDU 300 to acquire data. Therefore, the STA may be designed such that the VHT-SIGB field 370 is decoded only when the common control information included in the VHT-SIGB field 370 indicates that the currently received PPDU 300 is transmitted using MU-MIMO transmission. On the contrary, the STA may be designed such that the VHT-SIGB field 370 is not decoded when the common control information indicates that the currently received PPDU 300 is for a single STA (including SU-MIMO).

The VHT-SIGB field 370 includes length information of a PSDU included in the data field transmitted to each STA, MSC information, and tail related information included in the data field. Further, the VHT-SIGB field 370 includes information on encoding and rate-matching. A size of the VHT-SIGB field 370 may differ according to the MIMO transmission method (MU-MIMO or SU-MIMO) and a channel bandwidth used for PPDU transmission.

The data field 380 includes data intended to be transmitted to the STA. The data field 380 includes a service field for initializing a scrambler and a PLCP service data unit (PSDU) to which a MAC protocol data unit (MPDU) of a MAC layer is delivered, a tail field including a bit sequence required to reset a convolution encoder to a zero state, and padding bits for normalizing a length of the data field.

In the WLAN system of FIG. 1, if the AP 10 intends to transmit data to the STA1 21, the STA2 22, and the STA3 23, then a PPDU may be transmitted to an STA group including the STA1 21, the STA2 22, the STA3 23, and the STA4 24. In this case, as shown in FIG. 2, no spatial stream may be allocated to the STA4 24, and a specific number of spatial streams may be allocated to each of the STA1 21, the STA2 22, and the STA3 23 and then data can be transmitted according thereto. In the example of FIG. 2, one spatial stream is allocated to the STA1 21, three spatial streams are allocated to the STA2 22, and two spatial streams are allocated to the STA3 23.

In order to transmit data to a receiving STA group through a MU-MIMO transmission scheme by using the PPDU format of FIG. 3, information on an STA group needs to be provided to each STA. That is, each STA can know that it is a target STA of a transmitted PPDU only when information related to a group ID to be assigned thereto is received in advance.

An AP can transmit a group ID management message to each STA before transmitting the PPDU through the MU-MIMO transmission scheme. The group ID management message includes a group ID to be assigned to the STA and spatial stream information related to the group ID. The group ID management message can be transmitted to the STA through transmission of a group ID management frame including a group ID management information element. However, the group ID management information element can be transmitted by being included in another management frame.

Figure 4:
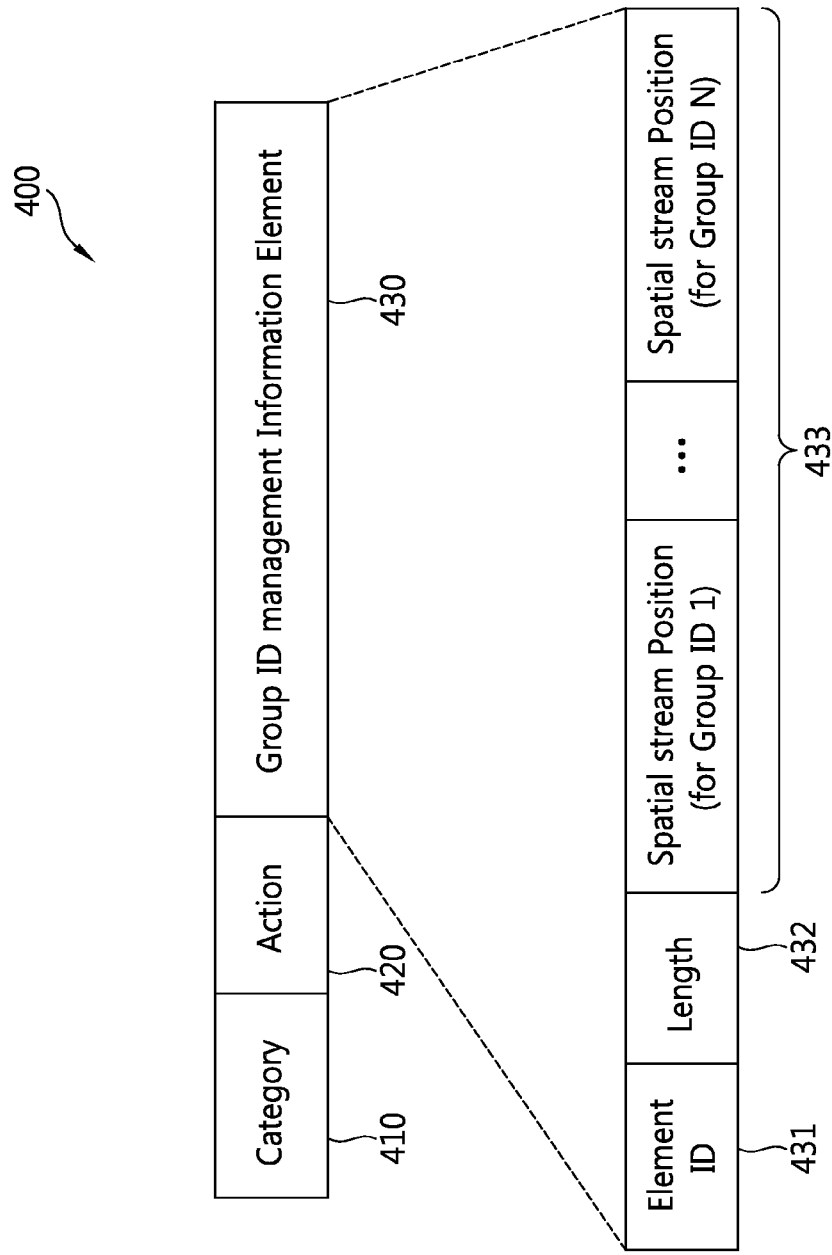
FIG. 4 shows a format of a group ID management frame according to an embodiment of the present invention.

FIG. 4 shows a format of a group ID management frame according to an embodiment of the present invention.

Referring to FIG. 4, a group ID management frame 400 includes a category field 410, an action field 420, and a group ID management information element field 430.

The category field 410 and the action field 420 are configured to indicate that a corresponding frame is a group ID management frame.

The group ID management information element field 430 includes an element ID field 431, a length field 432, and at least one spatial stream position field 433.

The element ID field 431 is configured to indicate that a corresponding information element is a group ID management information element. The length field 432 is configured to indicate a length of the group ID management information element.

The spatial stream position field 433 includes information indicating, for each group ID, whether a spatial stream belongs to a specific group and if it belongs to the specific group, a specific position at which the spatial stream is located.

For example, it is assumed that bits of the spatial stream position field 433 are respectively set to values 0, 1, 2, 4, 0, 0, 0, . . . , 0, 0, 0. It can be seen that an STA receiving the group ID management frame 400 is included in an STA group based on a group ID 2, a group ID 3, and a group ID 4. In such a situation, the STA can know that its spatial stream is a first spatial stream in a group having the group ID 2, a second spatial stream in a group having the group ID 3, and a fourth spatial stream in a group having the group ID 4.

A position of the spatial stream implies that when the STA receives a PPDU to be transmitted to an STA group for a specific group ID, a spatial stream located in a position corresponding to a spatial stream position value has to be received. In addition, which spatial stream is used for the STA can be determined by using information regarding a spatial stream assigned to the STA and included in the VHT-SIGA field 340 having the PPDU format of FIG. 3.

The information regarding the spatial stream of the VHT-SIGA field 340 can indicate the number of spatial streams assigned to the spatial stream position. For example, as shown in FIG. 3, it is assumed that the VHT-SIGA field includes spatial stream information. The spatial stream information indicates that the number of spatial streams for a first spatial stream position is 1, the number of spatial streams for a second spatial stream position is 3, the number of spatial streams for a third spatial stream position is 2, and the number of spatial streams for a fourth spatial stream position is 0. If information indicating the group ID 2 is included in the VHT-SIGA field of the transmitted PPDU, a receiving STA can receive data through one spatial stream assigned to the first position. If information indicating the group ID 3 is included in the VHT-SIGA field, the receiving STA can receive data through three spatial streams assigned to the second position. If information indicating the group ID 4 is included in the VHT-SIGA field, the receiving STA can determine that there is no spatial stream assigned to the fourth position, that is, there is no data to be transmitted to the STA.

Meanwhile, if STAs belonging to an STA group based on a specific group ID operate in a power save mode, the STAs have to remain in an awake state when an AP transmits a PPDU to the STAs through the MU-MIMO transmission scheme. However, since STAs operating in a doze state cannot know a specific time point at which the AP starts to transmit the PPDU, it is difficult to determine a time of transitioning to the awake state. If a time at which the STA transitions to the awake state is faster than a time at which the AP performs MU-MIMO transmission, unnecessary power consumption occurs after an operation mode transitioning time and before a MU-MIMO transmission time point. To prevent this, a method is required in which the STAs of the STA group based on the specific group ID can operate by concurrently transitioning to the awake state at the MU-MIMO transmission time. For this, it is proposed that the AP delivers MU-MIMO scheduling information to the STAs.

Figure 5:
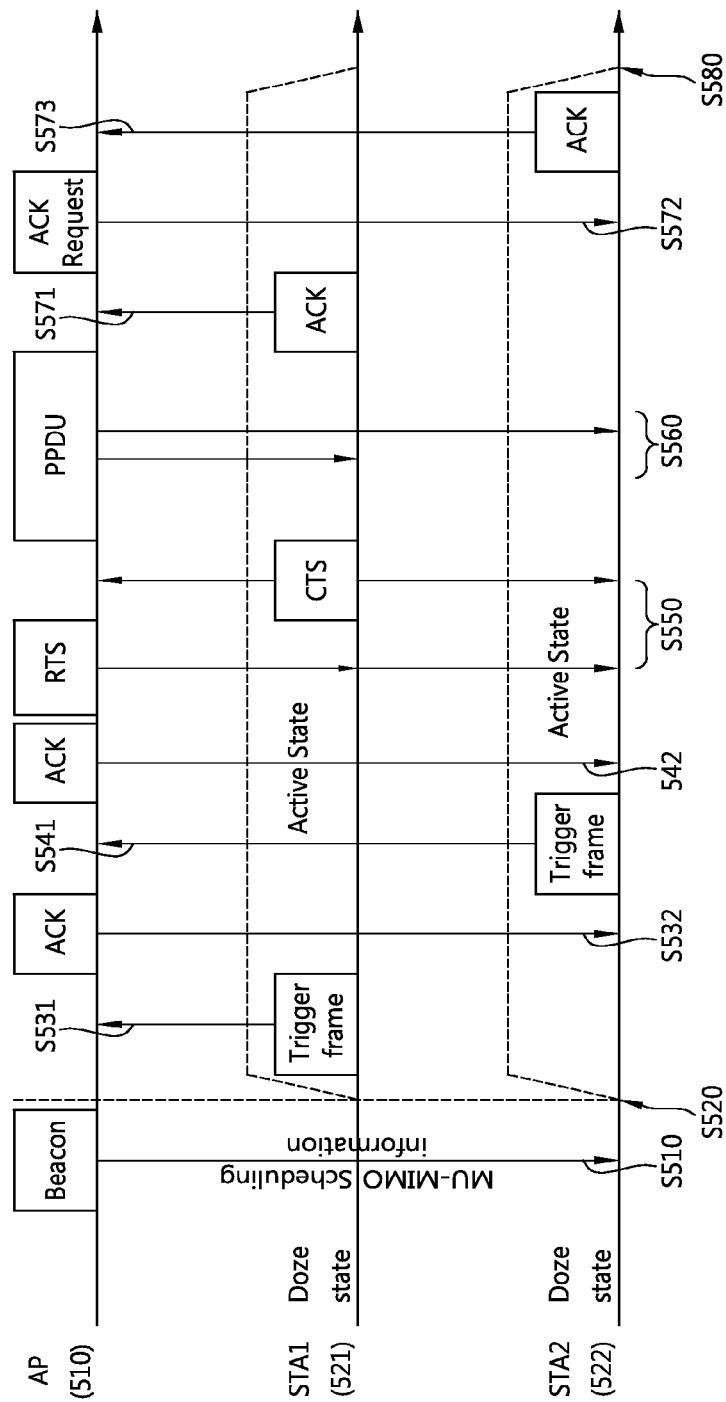
FIG. 5 shows a PPDU transmission method according to an embodiment of the present invention.

FIG. 5 shows a PPDU transmission method according to an embodiment of the present invention. An STA1 521 and an STA2 522 are MU-MIMO-paired with an AP 510. The STA1 521 and the STA2 522 are grouped by at least one group ID, and are STAs operating in a power save mode.

Referring to FIG. 5, the AP 510 transmits MU-MIMO scheduling information to the STAT 521 and the STA2 522 (step S510). The MU-MIMO scheduling information includes information related to a time at which a PPDU is transmitted to a specific STA group by using a MU-MIMO transmission scheme. The MU-MIMO scheduling information can be delivered when a MU-MIMO scheduling information element is transmitted by being included in a beacon frame. The beacon frame may further include a TIM element indicating that there is buffered traffic for STAs.

Figure 6:
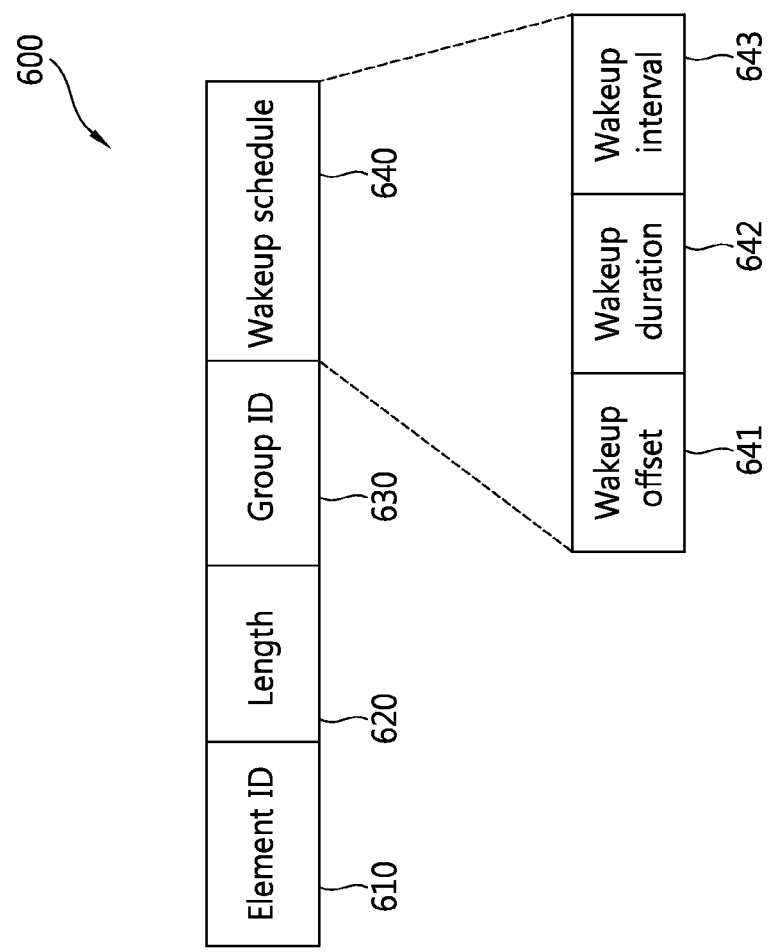
FIG. 6 shows a format of a MU-MIMO scheduling information element according to an embodiment of the present invention.

FIG. 6 shows a format of a MU-MIMO scheduling information element according to an embodiment of the present invention.

Referring to FIG. 6, a MU-MIMO scheduling information element 600 includes an element ID field 610, a length field 620, a group ID field 630, and a wakeup schedule field 640.

The element ID field 610 is set to a value indicating that a specific element is a MU-MIMO scheduling information element. The length field 620 is set to a value indicating a length of the MU-MIMO scheduling information element 600.

The group ID field 630 is set to a group ID value indicating a transmission target STA group of a PPDU transmitted by an AP. STAs can determine whether the MU-MIMO scheduling information element 600 is an information element for them by using a group ID value of the group ID field 630. If the group ID field 630 is different from a group ID value of a receiving STA, the receiving STA discards the information element and operates according to a typical power save mode operation method. If the wakeup schedule field 640 is equal to a group ID value assigned to the receiving STA, the receiving STA operates in a power save mode on the basis of information included in the wakeup schedule field 640.

The wakeup schedule field 640 includes a wakeup offset subfield 641, a wakeup duration subfield 642, and a wakeup interval subfield 643.

The wakeup offset subfield 641 indicates a time interval with respect to wakeup timing which is a first operation state transition time from a time point at which the MU-MIMO scheduling information element 600 is received.

The wakeup duration subfield 642 indicates a time length of a wakeup period which is a time period in which a state is maintained after transitioning to the awake state.

The wakeup interval subfield 643 indicates a time interval between contiguous wakeup periods.

Referring back to FIG. 5, the STA1 521 and the STA2 522 which operate in the power save mode can know that there is buffered traffic for them by using the transmitted TIM element. In addition, information on a time point at which MU-MIMO transmission starts for an STA group based on a group ID assigned thereto can be acquired by using the MU-MIMO scheduling information element.

The STA1 521 and the STA2 522 transition to the awake state at wakeup timing which is a time point indicated by the wakeup offset subfield 641 of the MU-MIMO scheduling information element and wait to MU-MIMO transmission performed by the AP 510 (step S520).

After transitioning to the awake state, the STA1 521 transmits a trigger frame to the AP 510 and thus starts a service period (step S531). The STA2 522 also transmits a trigger frame to the AP 510 after transitioning to the awake state and thus starts a service period (step S542). This is to report to the AP 510 that STAs belonging to a transmission target STA group transition to the awake state and wait for transmission before transmitting a PPDU through the MU-MIMO transmission scheme. This is because it cannot be assumed that STAs which are grouped for MU-MIMO transmission receive the same beacon frame and concurrently transition to the awake state since a listen interval, that is, an interval for receiving a beacon frame, may differ from one STA to another.

The AP 510 transmits respective acknowledgement (ACK) frames in response to the trigger frames transmitted by the STA1 521 and the STA2 522 (steps S532 and S542).

If STAs operating in the power save mode receive beacon frames according to a specific interval and a wakeup schedule is determined according to this interval, it can be assumed that the STAs concurrently transition to the awake state. In this case, the process in which the STA1 521 and the STA2 522 transmit the trigger frames to the AP 510 to start the service periods can be omitted.

The AP 510 configures an NAV by exchanging an RTS/CTS frame (step S550), and starts to transmit a PPDU through the MU-MIMO transmission scheme with respect to the STAs that start the service periods (step S560).

The STA1 521 transmits an ACK to the AP 510 in response to the received PPDU (step S571). After receiving the ACK from the STA1 521, the AP 510 transmits an ACK request frame to the STA2 522 to request ACK transmission (step S572). The STA2 522 transmits an ACK frame to the AP 510 in response to the ACK request frame (step S573). In this case, if a data unit included in the PPDU consists of an A-MPDU format, the ACK transmitted by the STA1 521 and the STA2 522 may be a block ACK.

If the PPDU transmitted by the AP 510 does not include data for the STAT 521 and/or the STA2 522, the STA1 521 and/or the STA2 522 can operate by transitioning to the doze state before the elapse of a time period indicated by the wakeup duration subfield 642. Whether the PPDU includes data for the STA1 521 and/or the STA2 522 can be determined based on information on a spatial stream included in a VHT-SIGA field of the PPDU. If the number of assigned spatial streams is '0', the STA1 521 and/or the STA2 522 determine that there is no data intended to be transmitted to the STA1 521 and/or the STA2 522 and can operate by transitioning to the doze state.

Among STAs operating in the power save mode, if there is an STA that does not transmit a trigger frame to the AP and does not start a service period, it is regarded that the STA does not receive a MU-MIMO scheduling information element and thus MU-MIMO transmission is not performed on the STA.

The STA1 521 and the STA2 522 complete PPDU reception from the AP 510, and operate by transitioning to the doze state at the elapse of a time period indicated by the wakeup duration subfield 642 (step S580).

A wakeup period of the STA1 521 and the STA2 522 can be repeated periodically. This can be implemented by including a wakeup interval subfield 643 into the scheduling information element 600. The wakeup interval subfield 643 indicates an interval in which the wakeup period is repeated as described above. In this case, the interval must be greater than a value of the wakeup interval subfield 643. Therefore, the STA1 521 and the STA2 522 can operate by transitioning to the awake state in every interval indicated by the wakeup interval subfield 643 with respect to a wakeup period start time point specified by the wakeup offset subfield 641. The AP 510, the STA1 521, and the STA2 522 can repetitively perform the power save mode operation method defined in the aforementioned wakeup period.

Meanwhile, if the MU-MIMO scheduling information element having the format of the FIG. 6 is broadcast in every beacon interval by being included in a beacon frame, it may further increase overhead resulted from transmission of the beacon frame. Therefore, the MU-MIMO scheduling information element can be transmitted by being included in a unicast frame. This can be implemented through transmission of an independent action/management frame including the MU-MIMO scheduling information element or the information element can be transmitted by being additionally included in the group ID management frame of FIG. 4.

Figure 7:
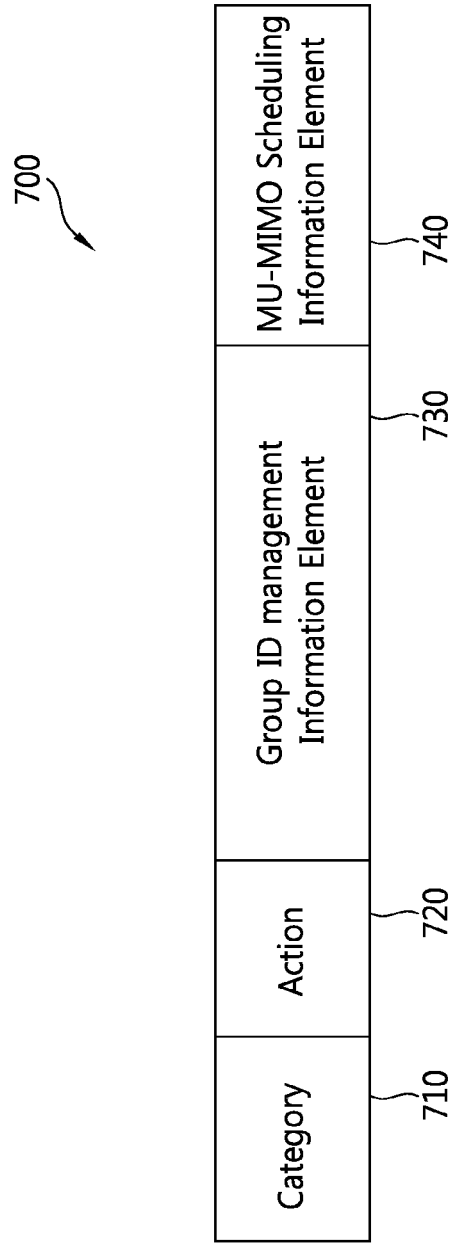
FIG. 7 shows another example of a group ID management frame format according to an embodiment of the present invention.

FIG. 7 shows another example of a group ID management frame format according to an embodiment of the present invention.

Referring to FIG. 7, a group ID management frame 700 includes a category field 710, an action field 720, a group ID management information element field 730, and a MU-MIMO scheduling information element field 740.

The category field 710 and the action field 720 are set to a value indicating that a specific frame is the group ID management frame 700. However, in order to determine whether the group ID management frame is configured in the format of FIG. 4 or in a format further including the MU-MIMO scheduling information element field 740, the category field 710 and the action field 720 can be set to values that can be distinguished from those of the category field 410 and the action field 420 of FIG. 4. If the category field 710 and the action field 720 are set to the same field values of FIG. 4, the group ID management frame 700 may further include a bit field indicating that the MU-MIMO scheduling information element field 740 is further included.

The group ID management information element field 730 includes the same field as the group ID management information element field 430 of FIG. 4. Accordingly, the STA operates based on the same protocol.

The MU-MIMO scheduling information element field 740 includes the same field as the MU-MIMO scheduling information element 600 of FIG. 6. Accordingly, the STA operates based on the same protocol, and an operation procedure of the AP and the STA after receiving of the beacon frame of FIG. 5 can be incorporated herein by reference.

Figure 8:
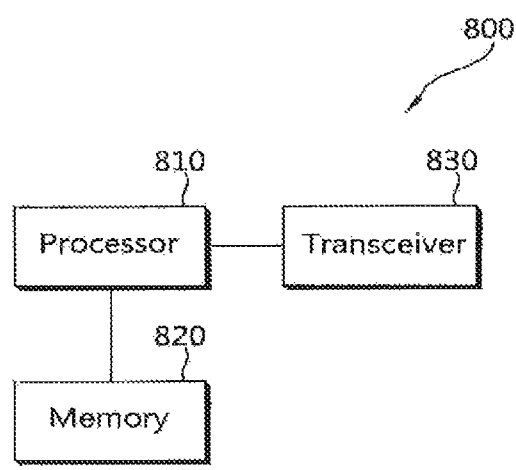
FIG. 8 is a block diagram showing a wireless apparatus according to an embodiment of the present invention.

FIG. 8 is a block diagram showing a wireless apparatus according to an embodiment of the present invention.

Referring to FIG. 8, a wireless apparatus 800 includes a processor 810, a memory 820, and a transceiver 830. The transceiver 830 transmits and/or receives a radio signal, and implements an IEEE 802.11 physical (PHY) layer. The processor 810 functionally coupled to the transceiver 830 can support a power save mode operation that operates by transitioning between an awake state and a doze state. The processor 810 can be configured to transmit and receive a MU-MIMO scheduling information element and to receive and transmit a PPDU on the basis of the MU-MIMO scheduling information element. The processor 810 is configured to implement a MAC layer and/or a PHY layer for implementing the embodiment of the present invention shown in FIG. 2 to FIG. 7.

The processor 810 and/or the transceiver 830 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 820 and may be performed by the processor 810. The memory 820 may be located inside or outside the processor 810, and may be coupled to the processor 810 by using various well-known means.

What is claimed is:

1. A method for a wireless local area network, the method comprising:
   transmitting, by an access point (AP), a multi user-multiple input multiple output (MU-MIMO) scheduling information to a target station, the MU-MIMO scheduling information including a group ID field and a wakeup scheduling field, the group ID field including a group ID indicating a group of stations to which the target station belongs, the wakeup scheduling field including a wakeup offset indicating a start time for data transmission;
   transmitting, by the AP, a beacon frame to the target station, the beacon frame including a traffic indication map (TIM) element indicating whether there is a buffered traffic to the target station; and
   receiving, by the AP, a trigger frame as a response to the buffered traffic from the target station based on the wakeup offset.

2. The method of claim 1, further comprising:
   transmitting, by the AP, a group ID management frame to the target station, the group ID management frame including information indicating the group ID.

3. The method of claim 1, wherein the MU-MIMO scheduling information is broadcast by the AP.

4. The method of claim 1, further comprising:
   transmitting, by the AP, a data frame including the buffered traffic to the target station after receiving the trigger frame.

5. A device for a wireless local area network, the device comprising:
   a radio frequency (RF) unit that receives and transmits radio signals; and
   a processor, operatively coupled with the RF unit, that:
   controls the RF unit to transmit a multi user-multiple input multiple output (MU-MIMO) scheduling information to a target station, the MU-MIMO scheduling information including a group ID field and a wakeup scheduling field, the group ID field including a group ID indicating a group of stations to which the target station belongs, the wakeup scheduling field including a wakeup offset indicating a start time for data transmission;
   controls the RF unit to transmit a beacon frame to the target station, the beacon frame including a traffic indication map (TIM) element indicating whether there is a buffered traffic to the target station; and
   controls the RF unit to receive a trigger frame as a response to the buffered traffic from the target station based on the wakeup offset.

6. The device of claim 5, wherein the processor:
   controls the RF unit to transmit a group ID management frame to the target station, the group ID management frame including information indicating the group ID.

7. The device of claim 5, wherein the MU-MIMO scheduling information is broadcast by the device.

8. The device of claim 5, wherein the processor:
   controls the RF unit to transmit a data frame including the buffered traffic to the target station after receiving the trigger frame.

* * * * *